April 15, 1952     D. L. MILLER     2,593,167

ENGINE STARTER GEARING

Filed Sept. 22, 1950

WITNESS:
Esther M. Stockton

INVENTOR.
Donald L. Miller
BY
Clinton S. Janes
ATTORNEY

Patented Apr. 15, 1952

2,593,167

UNITED STATES PATENT OFFICE 2,593,167

ENGINE STARTER GEARING

Donald L. Miller, Horseheads, N. Y., assignor to Bendix Aviation Corporation, a corporation of Delaware Application September 22, 1950, Serial No. 186,250

3 Claims. (Cl. 74—6)

1

The present invention relates to engine starter gearing, and more particularly to that type in which a motor driven pinion is slid longitudinally by some extraneous force into and out of mesh with a gear of the engine to be started.

It is an object of the present invention to provide a novel engine starter shift which is efficient and reliable in operation, small in size, and simple and economical in construction.

It is another object to provide such a device which is intended for standard or light duty installations as compared with the heavy duty shift shown in applicant's Patent 2,554,445, dated May 22, 1951.

Further objects and advantages will be apparent from the following description taken in connection with the accompanying drawing in which.

Figure 1:
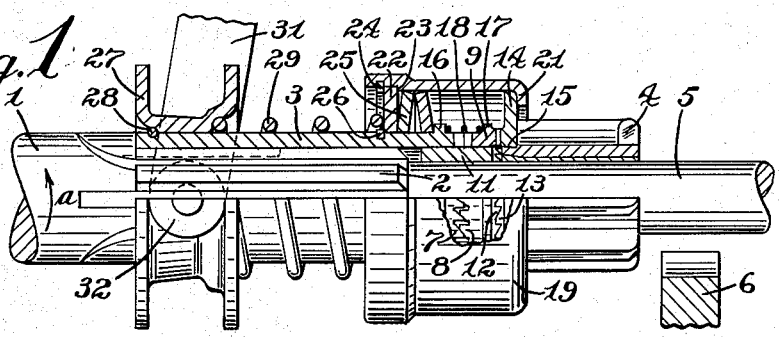
Fig. 1 is a side elevation partly broken away and in section of a preferred embodiment of the invention showing the parts in idle position.

In Fig. 1 of the drawing there is illustrated a power shaft 1 having a splined portion 2 on which a hollow sleeve 3 is slidably but non-rotatably mounted. A pinion 4 is slidably journalled on a reduced smooth portion 5 of the power shaft 1 for movement into and out of mesh with a gear 6 of the engine to be started.

The sleeve 3 is provided on its end with a series of teeth 7 having inclined driving surfaces which are engaged by corresponding inclined surfaces on teeth 8 of a slidable clutch ring 9. A bushing 11 is fixedly mounted in any suitable manner in the end of the sleeve 3 and is journalled on the smooth portion 5 of the power shaft so as to form a bearing for the sleeve and for the clutch ring 9 which is journalled on said bushing.

Clutch ring 9 is also provided with overrunning clutch teeth 12 which are arranged to cooperate with similar teeth 13 on an overrunning clutch member 14 which is rigidly mounted in any suitable manner as indicated at 15 on the end of the pinion 4. The sleeve 3 is provided with a circumferential shoulder 16, the clutch ring 9 is provided with a similar shoulder 17 and a light compression spring 18 is seated on said members against the shoulders so as to normally maintain the overrunning clutch teeth 12, 13 in engagement.

2

Means for limiting the separation of the sleeve and clutch members is provided comprising a barrel member 19 having an inturned flange 21 at one end embracing the driven overrunning clutch member 14, and a disc 22 anchored in the other end of the barrel against an internal shoulder 23 by means of a split lock ring 24. Disc 22 bears on the exterior of the splined sleeve 3, and one or more stiff compression spring members here shown in the form of spring washers 25 are located between the disc 22 and the shoulder 16 on the sleeve 3. A lock ring 26 seated in the sleeve 3 limits the movement of the disc 22 away from the shoulder 16 so as to maintain the spring washers 25 under initial compression.

Means for sliding the splined sleeve 3 on the power shaft 1 to move the pinion 4 into and out of mesh with gear 6 is provided in the form of a grooved collar 27 slidably mounted on the exterior of said sleeve and normally held against a lock ring 28 on the sleeve by means of a mesh enforcing spring 29 located between said collar and the disc 22. A shift fork 31 operated either manually or in any other suitable manner is provided with rollers 32 engaging in the channel of the collar to effect the shifting movement.

Figure 2:
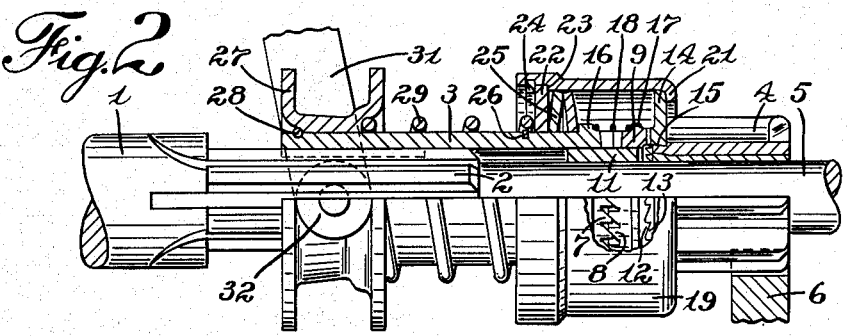
Fig. 2 is a similar view showing the parts in cranking position.

In operation, starting with the parts in normal positions, as shown in Fig. 1, movement of the sleeve 3 to the right by the fork 31 causes the pinion 4 to mesh with the engine gear 6. When this shifting movement has been completed, the starting switch is closed in the usual manner, thus causing rotation of the power shaft 1 in the direction of the arrow $a$. Torque is then transmitted from the power shaft through the splined sleeve 3 and the inclined teeth 7 of the sleeve to the similar teeth 8 of the clutch ring 9, thus causing rotation of the clutch ring and applying longitudinal pressure thereto which compresses the overrunning clutch members 12, 13 so as to hold them firmly together. The reaction of the inclined surfaces of teeth 7, 8 causes compression of the spring members 25 as shown in Fig. 2, and if the torque should exceed a predetermined maximum, these spring members compress sufficiently to allow slippage to take place between the sleeve and clutch ring.

Figure 3:
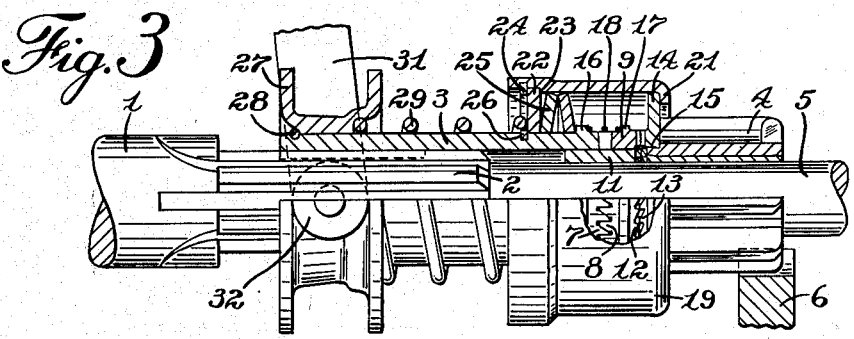
Fig. 3 is a similar view showing the parts in positions assumed when the engine fires and overruns the starting motor.

When the engine starts, the release of the cranking load permits the clutch ring 9 to move toward the sleeve 3 compressing the light spring 18 and permitting the clutch teeth 12, 13 to overrun as shown in Fig. 3. If the engine does not continue self-operative, the overrunning clutch teeth are re-engaged by the spring 18 as soon as the speed of the motor equals the speed of the pinion 4, whereupon cranking is resumed. When the engine is successfuly started, the parts are returned to idle position by the shift fork 31.

Although but one embodiment of the invention has been shown and described in detail, it will be understood other embodiments are possible and changes may be made in the precise form and arrangement of the parts without departing from the spirit of the invention.

I claim:

1. In engine starter gearing, a power shaft, a hollow sleeve splined thereon, formed on one end with inclined driving surfaces, a clutch ring having on one end inclined driven surfaces cooperating with the inclined surfaces of the sleeve, and on the other end having overrunning clutch teeth; a pinion slidably journalled on the driving shaft, a driven overrunning clutch member fixed to the pinion having teeth cooperating with those of the clutch ring, said clutch ring and sleeve having circumferential shoulders, a compression spring on the sleeve and ring between said shoulders, and means including a barrel member surrounding the clutch members for yieldingly limiting the separation of the clutch members and sleeve.

2. Starter gearing as set forth in claim 1 including further a bushing fixed in the end of the splined sleeve, bearing on the power shaft, extending within the clutch ring and forming a bearing therefor.

3 Starter gearing as set forth in claim 1 in which the means for limiting the separation of the clutch members includes a disc slidably mounted on the splined sleeve, a stiff compression spring between said disc and the shoulder on the sleeve, and means for positively limiting movement of the disc away from said shoulder to thereby maintain said spring under initial compression, the barrel having means anchoring the disc from longitudinal movement therein.

DONALD L. MILLER.

REFERENCES CITED

The following references are of record in the file of this patent:

UNITED STATES PATENTS

| Number | Name | Date |
|---|---|---|
| 2,500,132 | Miller | Mar. 7, 1950 |